Aug. 16, 1938.  L. S. BOONE  2,127,152
AIR COMPRESSOR
Filed Sept. 30, 1937
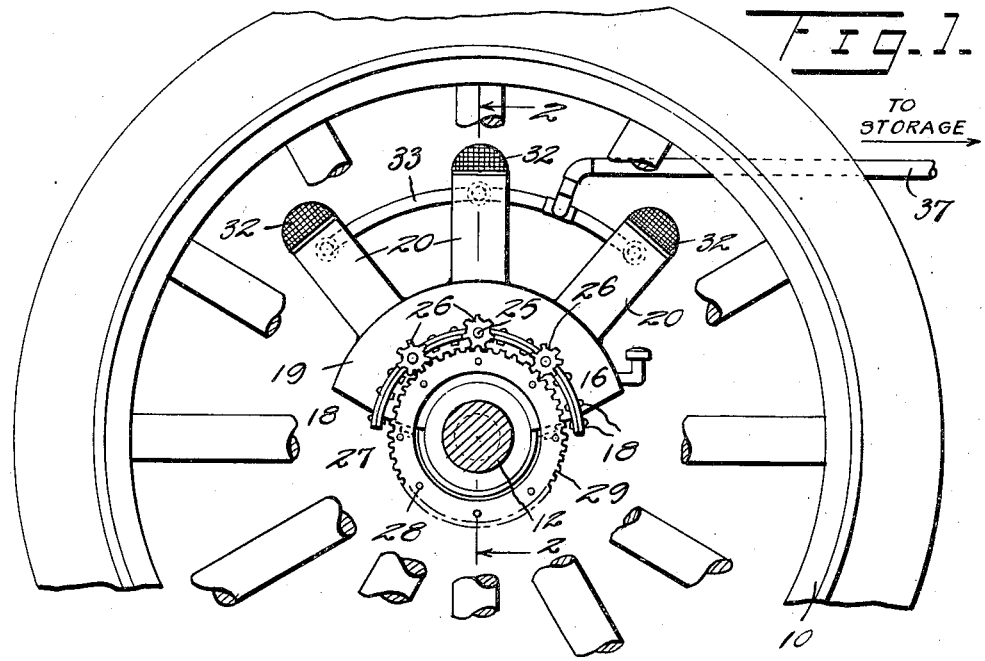
Fig. 1.
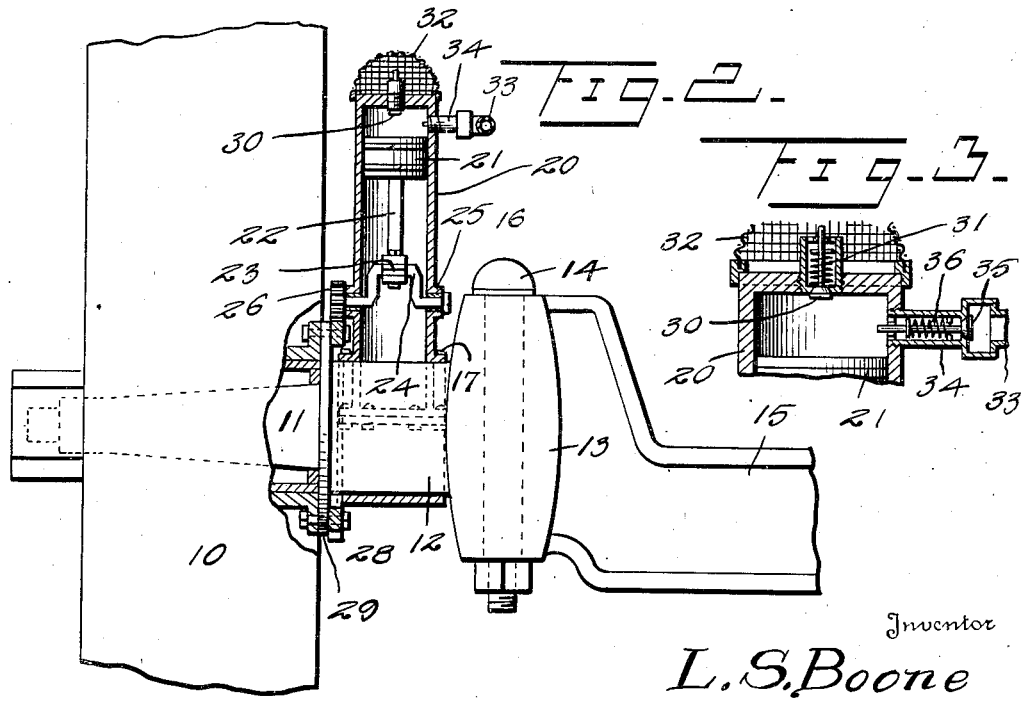
Fig. 2.
Fig. 3.
Inventor
L. S. Boone
By L. F. Randolph
Attorney Patented Aug. 16, 1938

2,127,152

UNITED STATES PATENT OFFICE 2,127,152

AIR COMPRESSOR

Loys S. Boone, Hugheston, W. Va.

Application September 30, 1937, Serial No. 166,672

1 Claim. (Cl. 230—35)

This invention relates to an air compressor and it aims to provide an air compressor somewhat in the nature of an attachment to a vehicle usually of the self-propelled type, to be operated from one or both of the front wheels thereof and the compressed air to be used to aid in the propulsion of the vehicle or for any other desired purpose.

Various additional objects and advantages will become apparent from a consideration of the description following taken in connection with accompanying drawing illustrating an operative embodiment.

In said drawing:—

Figure 1 is a view taken transversely of the front axle of a self-propelled vehicle, showing the improvements in place and in combination with the front wheel of the vehicle;

Figure 2 is a fragmentary view, partly in section, of the parts of Figure 1 taken at a right angle thereto, substantially on the line 2—2 of Figure 1, and Figure 3 is an enlarged substantially central longitudinal detail, in section, through the upper end of one of the cylinders.

Referring specifically to the drawing wherein like reference characters designate like or similar parts, 10 designates a front wheel of a vehicle, usually a self-propelled vehicle, which is suitably journaled on an axle spindle 11 forming part of a knuckle 12 having a portion 13, journaled on a vertical axis 14 to a front crossbeam 15 of an automobile or self-propelled vehicle. Although the improvements are shown as applied to but one front wheel, they may be applied to both of the front wheels of the vehicle.

In accordance with the invention, one crankcase section 16 is bolted or otherwise fastened as at 17 to the knuckle portion 12. Detachably bolted as at 18 to the section 16 is a crankcase section 19, completing the crankcase, and having any desired number of cylinders radiating therefrom, for instance three as shown at 20.

A piston 21 is reciprocable within each cylinder 20, having a connecting rod 22 suitably pivotally connected at 23 to crank 24 of shaft 25, journaled in suitable bearings located between the sections 16 and 19. Said shafts 25 exteriorly of the crankcase, and on one end thereof are equipped with pinions 26 enmeshed with an annular gear ring or rack 27 rigidly but detachably bolted as at 28 to a part 29 on the hub of wheel 10 so that the rack 27 will rotate with the wheel.

In the upper end wall of each cylinder, an air intake valve 30 is provided which is normally closed by a spring 31, and which opens for the intake of air on the down stroke of the pistons 21. Disposed over the valves 30 are cloth or metallic gauze elements 32 which serve to filter the air passing through the same to prevent the entrance of solid particles.

A manifold pipe 33 is connected with each cylinder 20 adjacent the upper ends thereof, the connections being designated 34 and in each connection, an outlet valve 35 is disposed being urged to its seat by a spring 36.

This valve works the opposite to the valve 30 so that on the down stroke of the piston 21, it will remain closed while on the up stroke of the piston the compressed air will force the same open and into the manifold 33 from which the same is led by a pipe 37 to a suitable storage tank (not shown). The compressed air may be used for any desired purposes and for instance to aid the propelling engine of the vehicle equipped with the improvements, when it is of an adaptable type.

It will be clear that as the wheel 10 rotates, the annular rack 27 will rotate pinions 26 and thus turn the crankshafts 25 and accordingly reciprocate the pistons 21 to draw in air past the valves 30, and then compress such air and expel it through the valves 35 into the manifold 33 and pipe 37 from which it passes to the storage tank or place of use.

It is clear that prior to starting the initial operation of the device, that the cylinders may be filled with compressed air.

Various changes may be resorted to provided they fall within the spirit and scope of the invention.

I claim as my invention:—

In combination, a ground wheel of a vehicle and a spindle on which said ground wheel is journaled, a gear member detachably mounted on said wheel to rotate therewith, an air compressor removably mounted on said spindle having cylinders, pistons operable in the cylinders, crankshafts connected to the pistons, pinions on the crankshafts enmeshed with said gear member, said air compressor having a crankcase of two separable arcuate sections, one of said sections being secured to the spindle, bearings between the junction edges of said sections in which said shafts are journaled, said cylinders radiating from one of the sections, each cylinder having a normally closed air inlet valve and a normally closed air outlet valve, and a manifold with which the last mentioned valves communicate to conduct compressed air to storage or point of use, said manifold being in sections connecting adjacent cylinders and located intermediate the ends of the cylinders.

LOYS S. BOONE.